March 15, 1927.     J. CATHRILL     1,620,872
HEADLIGHT LENS
Filed Feb. 3, 1925
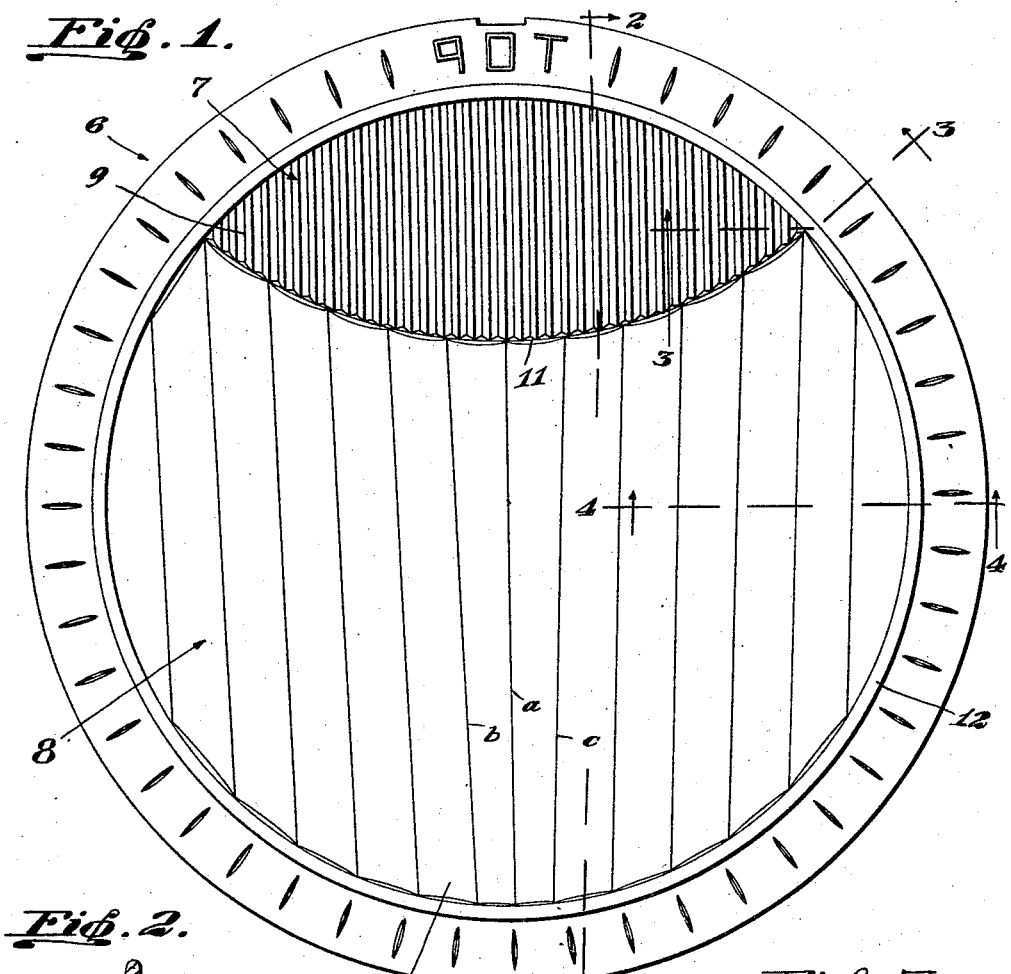
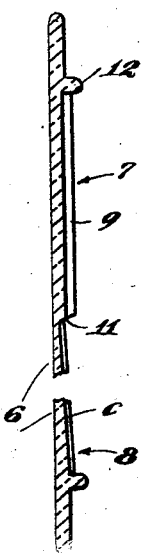
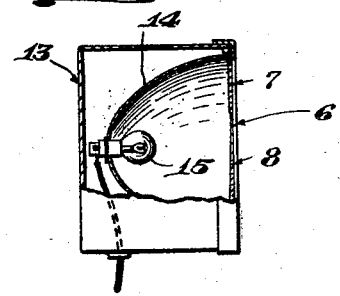
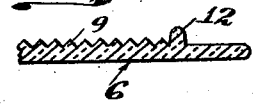
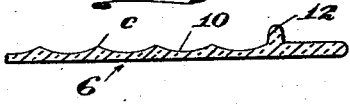
INVENTOR.
Jack Cathrill,
BY
ATTORNEY Patented Mar. 15, 1927.

1,620,872

UNITED STATES PATENT OFFICE.

JACK CATHRILL, OF WEST HOLLYWOOD, CALIFORNIA.

HEADLIGHT LENS.

Application filed February 3, 1925. Serial No. 6,508.

This invention particularly pertains to a lens which is especially adapted for use on the head lamps of motor vehicles and the like. The primary object of the invention is to provide a lens of the above character which is so formed as to effect such diffusion and distribution of light rays emanating from the lamp as to minimize the blinding action of the rays, and at the same time form a beam that will afford proper illumination.

Another object is to provide a headlight lens which is so formed as to eliminate objectionable upwardly projecting rays of a beam light and also effect an increase in the lateral spread of the beam.

The mode of carrying out the foregoing objects, as well as such objects, features and advantages of the invention as may subsequently appear, is hereinafter described and is illustrated by way of example in the accompanying drawings in which the several views depict constructions and arrangement of elements and parts whereby the invention may be carried into effect.

Referring to the drawings the several views are as follows:—

Figure 1 is a view of the lens as seen in rear elevation;

Figure 2 is a view of the lens in vertical section as seen on the line 2—2 of Figure 1;

Figure 3 is a detail in horizontal section as seen on the line 3—3 of Figure 1;

Figure 4 is a detail in horizontal section as seen on the line 4—4 of Figure 1; and Figure 5 is a view in vertical section illustrating the lens as applied to a head lamp.

The lens, as here shown, embodies a circular plate 6 formed of glass which is transparent but which by reason of certain prismatic forms on the surface thereof the lens as a whole is rendered translucent. One side of the plate is smooth throughout and the reverse side thereof is formed with upper and lower areas 7 and 8, respectively, of prisms or ribs; the upper area 7 being formed throughout with small vertical parallel prisms 9 of which there are approximately thirteen to every two inches transversely of the lens, and the lower area being formed with a series of shallow prisms 10 each about nine-sixteenths of an inch wide. The prisms 9 are formed substantially triangular in cross section; the faces thereof being flat and extending on angles of forty-five degrees in relation to the general plane of the lens, as shown in Figure 3. The prisms 10 are formed with transversely concaved faces of slight curvature in transverse section; with the faces of each prism extending at a slight angle to the vertical plane of the lens and with the faces of adjacent prisms joined by and merging into a slightly concave surface extending intermediate the prisms, as shown in Figure 4. The prisms 10 of the area 8 include a central prism extending on the vertical center of the lens, as indicated at $a$, and also include a series of prisms inclined slightly from the vertical in opposite inclinations on opposite sides of the central prism $a$, as indicated at $b$ and $c$. The meeting line 11 between the upper and lower areas 7 and 8 of the prisms extends on an inverted arc, the lower portion of which is spaced from the center of the upper margin of the lens a distance substantially equal to about one-third the diameter of the lens; this meeting line being formed on an arc having a radius of a length substantially equal to the radius of the outer margins of the prismatic areas 7 and 8, which margins are spaced inwardly from and concentric with the margin of the plate 6. The margin of the prismatic areas is bordered by an annular rib flange 12.

The lens is mounted in a headlight casing 13 in front of a parabolic mirror 14 and lighting element 15 in the usual manner as illustrated in Figure 5, with the area 7 arranged uppermost and with the central prism $a$ of the lower prisms 10 extending vertically.

By constructing the lens as shown and described the upwardly projected rays of a light beam emanating from the source of light 15 in the lamp, passing through the small vertical prisms 9 of the area 7, will be diffused by these small prisms and will be directed laterally so as to obviate the glare ordinarily occasioned by such rays. These small prisms being substantially V-shape in cross section act to preclude the emanation of any directly forward rays of light. The oppositely inclined prisms $b$ and $c$ serve to refract the light rays passing therethrough and act to direct certain of the rays downwardly and outwardly from opposite sides of the vertical center of the lens, thereby forming a wide flood light and effecting a lateral spread of the beam light, and said prisms $b$ and $c$, in order to preclude rays of forward and upward trend, are inclined relative to the plane of the faces of the lens, whereby to downwardly deflect the rays of light to avoid straight forwardly projected rays or glare.

I claim:—

1. A lens of the character described, a glass plate, one side of which is smooth and the other side of which is formed with upper and lower areas of prisms of different form; the upper area consisting of a series of vertical parallel prisms of triangular cross section, and the lower area embodying a series of shallow prisms including a series of parallel prisms on one side of the vertical center of the plate, inclined slightly to the vertical and a second series of parallel prisms on the other side of the vertical center of the plate inclined slightly to the vertical in the direction opposite that of the other series of prisms, the prisms of each series of the lower area being formed at an angle to the rear face of the lens.

2. In a lens of the character described, a glass plate having upper and lower prismatic areas of different character, the juncture of the upper and lower areas extending on an inverted arc; the upper area consisting of a series of vertical parallel prisms of triangular cross section and the lower area including a central vertical prism and oppositely inclined prisms on each side of the vertical prism, the prisms of each series of the lower area being formed at an angle to the rear face of the lens.

JACK CATHRILL.